(12) United States Patent
Lee et al.

(10) Patent No.: US 7,349,633 B2
(45) Date of Patent: Mar. 25, 2008

(54) ACCESS POINT FOR CONSTRUCTING OPTICAL FIBER-BASED HIGH-SPEED WIRELESS NETWORK SYSTEM

(75) Inventors: Jong-Hun Lee, Suwon-shi (KR); Yun-Kyung Oh, Seoul (KR); Sang-Il Lee, Seoul (KR); Seo-Won Kwon, Suwon-shi (KR); Jong-Hwa Lee, Suwon-shi (KR); Yun-Je Oh, Yongin-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 645 days.

(21) Appl. No.: 10/671,196

(22) Filed: Sep. 25, 2003

(65) Prior Publication Data

US 2004/0264969 A1 Dec. 30, 2004

(30) Foreign Application Priority Data

Jun. 30, 2003 (KR) ...................... 10-2003-0043855

(51) Int. Cl.
*H04B 10/00* (2006.01)
(52) U.S. Cl. ...................................... 398/115; 398/138
(58) Field of Classification Search ................ 398/115, 398/127, 139, 138, 135, 136, 137, 140, 141
See application file for complete search history.

(56) References Cited

U.S. PATENT DOCUMENTS

2003/0228151 A1* 12/2003 Niiho et al. ................ 398/115

2004/0108940 A1* 6/2004 Witkow et al. ........ 340/825.25

FOREIGN PATENT DOCUMENTS

| JP | 08-084133 | 3/1996 |
| JP | 10-229385 | 8/1998 |

* cited by examiner

*Primary Examiner*—Shi K Li
(74) *Attorney, Agent, or Firm*—Cha & Reiter, LLC

(57) ABSTRACT

An access point in an optical fiber-based high-speed optical wireless network is disclosed. The access point includes an antenna for receiving communication requirement signals, a switch for selectively outputting a corresponding signal according to the communication requirement signals, a bias control unit for selectively outputting bias current with variable intensity according to whether an output of the signal from the switch exists or not, on the basis of a threshold current; a bias operation unit for outputting input signals to the antenna when an input bias current is smaller than the threshold current and for outputting signals received by the antenna when an input bias current is larger than the predetermined threshold current, and a semiconductor optical amplifier for selectively performing an optical detection function of converting optical signals, which have been received through a first optical fiber from an central station, into electrical signals and sending the converted electrical signals to the bias operation unit, when a current smaller than the threshold current is input to the bias operation unit, and an optical modulation function of transmitting signals output from the bias operation unit through a second optical fiber to the central station, when a current larger than the threshold current is input to the bias operation unit.

6 Claims, 4 Drawing Sheets

ACCESS POINT FOR CONSTRUCTING OPTICAL FIBER-BASED HIGH-SPEED WIRELESS NETWORK SYSTEM

CLAIM OF PRIORITY

This application claims priority to an application entitled "Access point for constructing optical fiber-based high-speed optical wireless network system," filed in the Korean Intellectual Property Office on Jun. 30, 2003 and assigned Serial No. 2003-43855, the contents of which are hereby incorporated by reference.

BACKGROUND OF THE INVENTION

1. Field of the Invention

The present invention relates to an access point in a local area communication network system, more particularly to an access point utilizing a semiconductor optical amplifier capable optical fiber-based ultra-wideband (UWB) wireless communication in an indoor local area communication network system having a transmission speed of at least 100 Mbps using an ultra-wideband communication method.

2. Description of the Related Art

Ultra-wideband communication technology is a wireless communication technology for transmitting large amounts of digital data with a low power in a short distance by means of a wide spectrum frequency. A local area communication network system is a network system capable of performing mutual communication in a local area such as within a building complex, e.g., a house, an office or a hospital.

Such local area communication network systems may utilizing a wireless local area network (hereinafter, referred to as WLAN), which can transceive data through wirelessly. The WLANs in the local area communication network system maybe capable of a maximum transmission speed of 22 Mbps using a 2.4 GHz ISM (industrial, scientific and medical) band. Efforts to improve the transmission speed of such WLANs (e.g., a transmission speed of 54 Mbps at maximum in the 5 GHz band and a transmission speed more than 54 Mbps in millimeter wave band (30 GHz ~300 GHz)) are under development, but not yet perfected.

In currently available WLANs in local area communication network systems, a radio frequency (RF) signal with a frequency band of 2.4 GHz or 5 GHz is usually used as a carrier for carrying data. Since such WLANs have a superior mobility and has no cable connection in contrast with a wired LAN, the WLAN is generally preferable users.

It is also noted that according to the 802.11 ab/g standard, a WLAN is generally limited to have a maximum transmission speed of 54 Mbps. This limitation to the transmission speed of the WLAN may cause a bottleneck phenomenon in high speed and high capacity services provided through the existing WLAN by the fiber to the home (FTTH), so that it is nearly impossible to provide a satisfactory service to a home or office environment. In an attempt to solve such problems, an ultra-wideband signal has been used instead of a radio frequency signal band as a transmission medium in the WLANs. The transmission speed of the WLAN using the ultra-wideband signal as the transmission medium is at least 100 Mbps. In the ultra wideband-based WLAN, high speed and high capacity services are possible, but service area is limited to 10 m.

FIG. 1 is a diagram showing an example of a wireless network system for providing an ultra wideband-based WLAN service in the inside of a building.

As shown in FIG. 1, the wireless network system includes one central station (hereinafter, referred to as CS) 10 and a plurality of access points (hereinafter, referred to as AP) 22, 32 and 42. The CS 10 is connected to the APs 22, 32 and 42 through an optical fiber. The APs 22, 32 and 42 respectively construct sub-networks 20, 30 and 40 with respect to areas which are served by each of the APs 22, 32 and 42.

In FIG. 1, the APs 22, 32 and 42 are connected to the CS 10 through an optical fiber to construct a first sub-network 20, a second sub-network 30 and a third sub-network 40, respectively. In the first sub-network 20, a first AP 22 and a projector 24 perform ultra-wideband communication. In the second sub-network 30, a second AP 32, a television 34 and a notebook 36 perform ultra-wideband communication. In the third sub-network 40, a third AP 42, a computer 44 and a facsimile 46 perform ultra-wideband communication.

Also, a ultra-wideband signal is respectively transmitted from the CS 10 to the APs 22, 32 and 42 through an optical fiber. Further, high capacity services are provided to the CS 10 through a fiber-to-the-home (FTTH). The CS 10 may provide several services, such as a multi-media service, a video on demand (VOD), an education on demand (EOD) and an audio on demand (AOD), which can be provided by the FTTH, to the APs 22, 32 and 42 or terminals without service collision.

As shown in FIG. 1, in the ultra-wideband wireless network system, a plurality of APs 22, 32 and 42 are connected to one CS 10. Accordingly, in the ultra-wideband wireless network system, in order for the APs 22, 32 and 42 to be commercially competitive they need to be inexpensive to the user, light, small, consume low power and easy to use.

Conventional APs generally use a laser diode (hereinafter, referred to as LD) and a photodetector (hereinafter, referred to as PD, or an electro-absorption modulator (hereinafter, referred to as EAM).

In this regard, the APs that use the LDs and the PDs are the most common. In the AP, each LD and PD needs a driving circuit for driving the LD and the PD, an automatic temperature control (ATC) circuit for controlling an temperature of the LD and the PD, and an automatic power control (APC) circuit for controlling a supply of a power necessary for operating the LD and the PD.

Since many modules in the AP are necessary as described above, the size of the AP grows larger. Further, the conventional AP consumes a large amount of power to drive many modules.

In order to solve the problems occurring in APs using conventional LDs and PDs, an AP constructed by only single optical device, which can perform functions of a light source and an optical modulator at the same time, is known. This is an AP using the EAM, which is a single optical device. The EAM operates as the PD and the optical modulator according to the size of an applied reverse bias voltage.

However, when sufficient optical power is not input to the EAM, which may be due to an optical loss between a CS and an AP, an AP using the EAM has difficulty in operating as an PD and an optical modulator. In order to solve such problem, the CS must include an optical amplifier, which enables an optical power to be sufficiently transmitted to the AP, in consideration of the optical loss.

FIG. 2 is a block diagram showing an example of AP using a conventional LD and PD. Referring to FIG. 2, functions of each module according to a transmission of ultra-wideband signal are described according to each of downstream and upstream transmissions.

When an ultra-wideband signal is transmitted downward, an LD 13 in a CS 10 performs conversion in an ultra-wideband communication method through an optical fiber according to a driving signal input from an LD driver 12. It converts the ultra-wideband signal into an optical signal by performing a direct intensity modulation of the ultra-wideband signal. A splitter 15 transmits the converted optical signal to an AP 20 through an optical fiber.

A combiner 25 in the AP 20 transmits the received optical signal to a PD 22. The PD 22 converts the received optical signal into an electrical signal. A high-gain amplifying unit 23 amplifies the converted electrical signal to a level sufficient for a wireless transmission. A diplexer 24 sends the high-gain amplified ultra-wideband signal into the air through an antenna.

When the ultra-wideband signal is transmitted upward, ultra-wideband signal is received by an antenna. The diplexer 24 transmits the received ultra-wideband signal to a low noise amplifying unit 29. The low noise amplifying unit 29 low-noise amplifies the received ultra-wideband signal and outputs the amplified signal to an LD driver 28. The LD driver 28 generates a current corresponding to the low-noise amplified ultra-wideband signal and provides the generated current to an LD 27. The LD 27 generates an optical signal corresponding to the received current. The combiner 25 transmits the optical signal generated by the LD 27 to the CS 10 through an optical fiber.

The splitter 15 in the CS 10 receives the optical signal transmitted through the optical fiber and transmits the received optical signal to a PD 18. The PD 18 converts the received optical signal into an electrical signal. The high-gain amplifying unit 17 amplifies the converted electrical signal to a predetermined level and outputs the amplified signal to a module which demodulates amplified signal.

As described above, in constructing the AP using conventional LDs and PDs, the LDs and the PDs must be respectively included in each AP connected to the CS 10.

SUMMARY OF THE INVENTION

Accordingly, one object of the present invention is to solve the above-mentioned problems occurring in the prior art.

Another object of the present invention is to provide an access point in an ultra-wideband network system which can be more competitive in view of its size and cost.

Another object of the present invention is to provide an access point which can constructed using a single optical device in a high-speed optical fiber-based wireless ultra-wideband network system with at least 100 Mbps.

One embodiment of the present is directed an access point in an optical fiber-based high-speed optical wireless network including an antenna for transceiving signals for performing an ultra-wideband communication with outside devices and receiving communication requirement signals transmitted from the outside devices, and a semiconductor optical amplifier for selectively performing an optical detection function of converting optical signals, which have been received through a first optical fiber connected for receiving optical signals from an outside, into electrical signals and sending the converted electrical signals through the antenna, and an optical modulation function of converting signals, which have been received by the antenna through a second optical fiber connected for transmitting optical signals to an outside, into optical signals and transmitting the converted optical signals to an outside through second optical fiber, according to the communication requirement signals.

Preferably, the communication requirement signals includes reception requirement signals transmitted by the outside devices in order to receive corresponding data and transmission requirement signals transmitted by the outside devices in order to transmit corresponding data. The semiconductor optical amplifier performs the optical modulation function when the transmission requirement signals are received, and the semiconductor optical amplifier performs the optical detection function when the transmission requirement signals are not received. Further, the semiconductor optical amplifier may perform the optical detection function when the reception requirement signals are received, and the semiconductor optical amplifier may perform the optical modulation function when the transmission requirement signals are received.

Further, the access point in accordance with other aspects of the present invention further includes a switch for selectively outputting a signal for providing corresponding command according to communication requirement signals received by an antenna; a bias control unit for selectively outputting bias current with variable intensity according to whether an output of the signal from the switch exists or not, on the basis of a predetermined threshold current; and a bias control unit for outputting signals transmitted from the semiconductor optical amplifier to the antenna when a bias current, which is smaller than the predetermined threshold current, is output from the bias control unit, and for outputting signals received by the antenna to the semiconductor optical amplifier when a bias current, which is larger than the predetermined threshold current, is output from the bias control unit.

Preferably, the switch does not output the signal when the communication requirement signals are the reception requirement signals, and the switch outputs the signal when the communication requirement signals are the transmission requirement signals. Therefore, the bias control unit outputs the bias current, which is smaller than the predetermined threshold current, when the signal is not output from the switch, and the bias control unit outputs the bias current, which is larger than the predetermined threshold current, when the signal is outputted from the switch. Further, a reverse bias may be applied to the semiconductor optical amplifier in order to enable an optical detection function with more excellent response characteristic to be performed.

According to other aspects of the present invention, an AP can be constructed by means of a SOA, which is a single optical device with the optical detection function for a downstream communication and the optical modulation function for an upstream communication, thereby integrating sizes of products to smaller size and constructing networks with reduced manufacturing cost.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
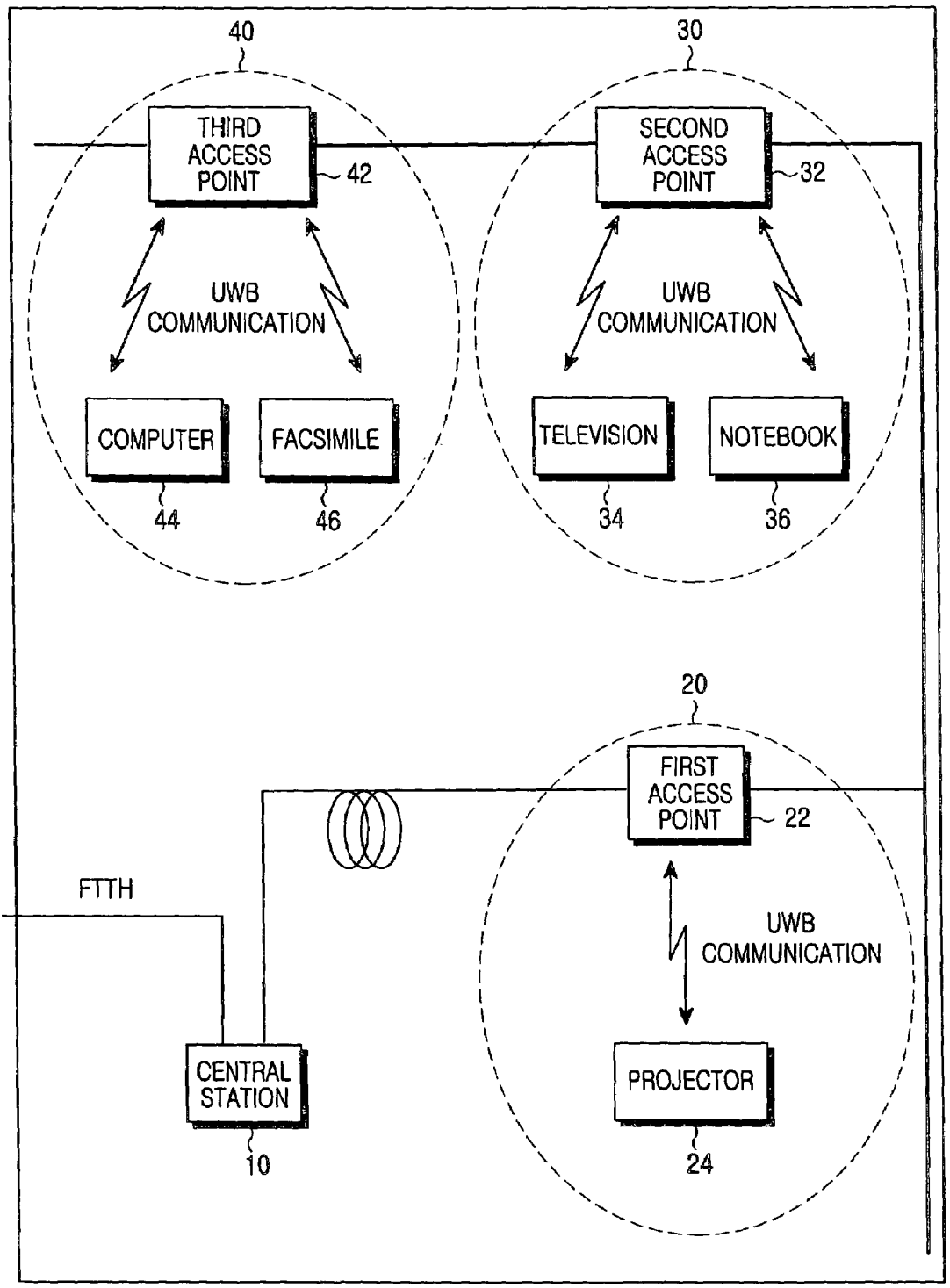
FIG. 1 is a diagram showing an example of a wireless network system for providing an ultra wideband-based wireless local area network service in the inside of a house.
Figure 2:
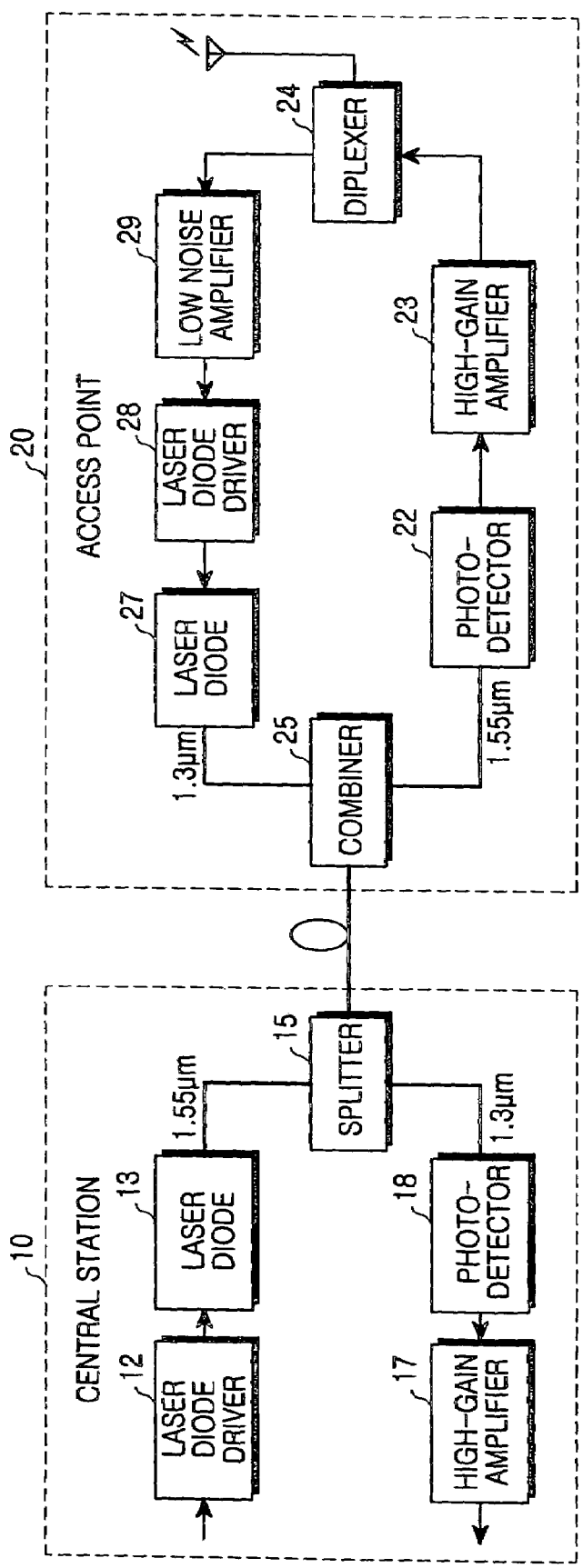
FIG. 2 is a block diagram showing an example of an access point realized by using a conventional laser diode and photodetector.

Hereinafter, a preferred embodiment according to the present invention will be described with reference to the accompanying drawings. The same reference numerals are used to designate the same elements as those shown in other drawings. In the below description, many particular items, such as detailed elements of circuit, are shown, but these are provided for helping the general understanding of the present invention, it will be understood by those skilled in the art that the present invention can be embodied without the particular items. For the purposes of clarity and simplicity, a detailed description of known functions and configurations incorporated herein will be omitted as it may obscure the subject matter of the present invention.

Figure 3:
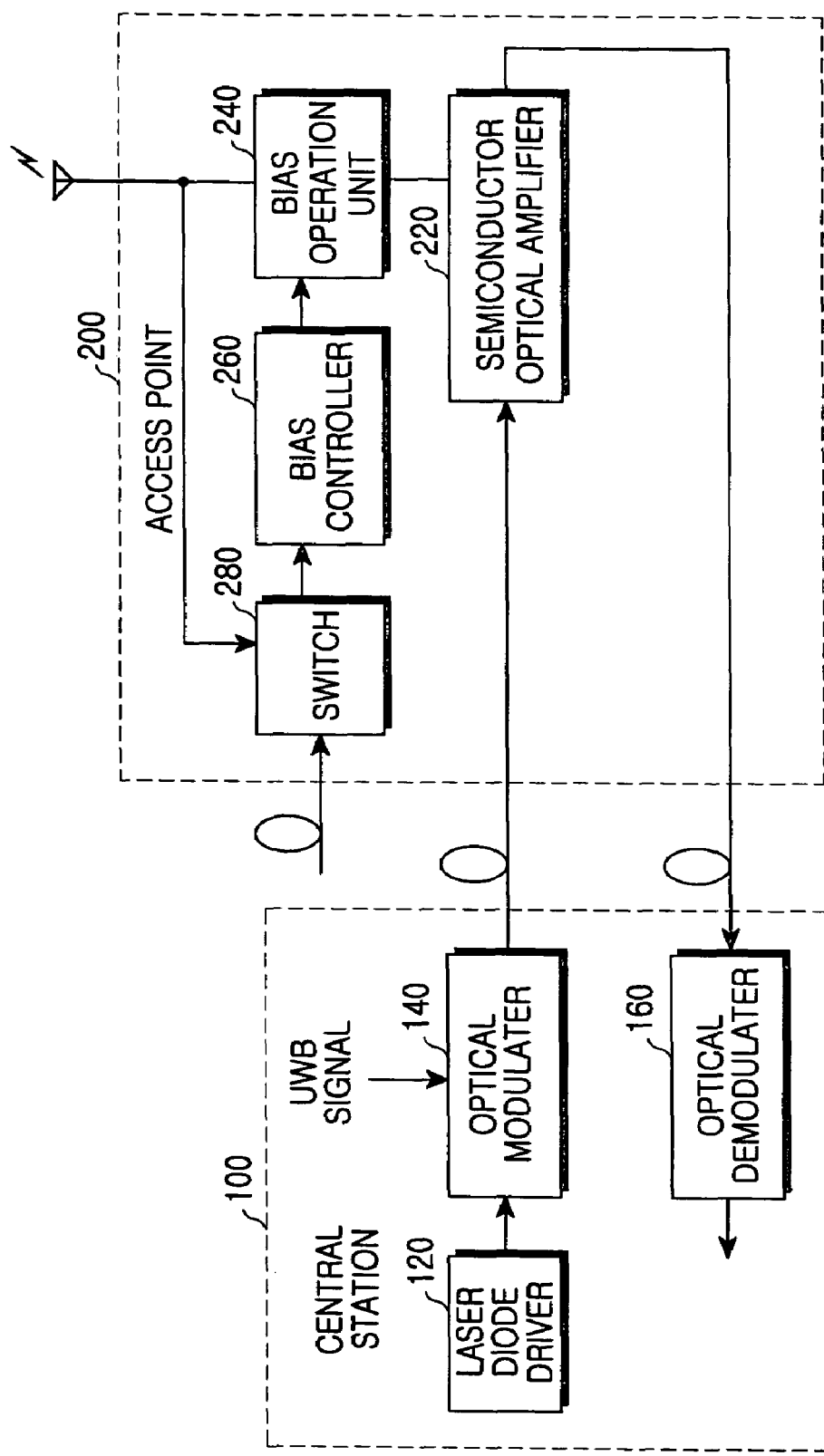
FIG. 3 is a block diagram showing a preferred embodiment in an optical fiber-based ultra wideband high-speed wireless network system according to aspects of the present invention.

FIG. 3 is a block diagram showing a embodiment of the present invention. As shown in FIG. 3, an ultra wideband high-speed wireless network system includes a central station (hereinafter, referred to as CS) 100 and an access point (hereinafter, referred to as AP) 200 connected to the CS 100 through a first optical fiber line for transmitting optical signals and a second optical fiber line for receiving optical signals.

The CS 100 is connected to the AP 200 through the first optical fiber line for transmitting optical signals and the second optical fiber line for receiving optical signals. The CS 100 converts electrical signals, which are ultra-wideband signals to be transmitted, into optical signals and transmits the converted optical signals through the first optical fiber. The CS 100 converts optical signals received through the second optical fiber into electrical signals and then restores ultra-wideband signals.

The CS 100 includes a laser diode driver 120, an optical modulation unit 140 and an optical demodulation unit 160. The laser diode driver 120 supplies the optical modulation unit 140 with a current for driving the optical modulation unit 140. The optical modulation unit 140 converts electrical signals, which are ultra-wideband signals to be transmitted, into optical signals on the basis of the supplied current and transmits the converted optical signals to the AP 200 through the first optical fiber. The optical demodulation unit 160 receives optical signals transmitted from the AP 200 through the second optical fiber and converts the received optical signals into electrical signals.

The AP 200 includes a semiconductor optical amplifier (hereinafter, referred to as SOA) 220 which has an optical detection function of converting optical signals transmitted through the first optical fiber into electrical signals and an optical modulation function of converting electrical signals received by an antenna into optical signals. The AP 200 sends electrical signals converted by means of the optical detection function through the antenna and transmits optical signals converted by means of the optical modulation function to the CS 100 through the second optical fiber.

The AP 200 includes the SOA 220, a bias operation unit 240, a bias control unit 260 and a switch 280. When optical signals are received through the first optical fiber, the SOA 220 converts received optical signals into electrical signals by means of the optical detection function and transmits the converted electrical signals to the bias operation unit 240. Further, when ultra-wideband signals, which have been received by an antenna, are received from the bias operation unit 240, the SOA 220 converts received electrical signals, which are ultra-wideband signals, into optical signals and transmits the converted optical signals to the CS 100 through the second optical fiber.

The SOA 220 is a core optical device applied to several products such as a high-speed optical gate switch, a high-speed optical modulator, an optical amplifier or an optical detector. The SOA 220 in an embodiment in accordance with aspects of the present invention. The SOA 220 is designed to perform the optical detection function and the optical modulation function at the same time in addition to an amplifying function. In this regard, the AP 200 is realized by means of only the SOA 220 which is a single device.

The bias operation unit 240 outputs the electrical signals transmitted from the SOA 220 to an antenna according to an input bias current intensity or outputs ultra-wideband signals, which have been received by an antenna, to the SOA 220. Preferably, when a bias current applied to the bias operation unit 240 has an intensity within an optical absorption area, in which the intensity is smaller than a predetermined threshold, the bias operation unit 240 outputs the electrical signals transmitted from the SOA 220 to an antenna. Further, a bias current applied to the bias operation unit 240 has an intensity within a linear area, in which the intensity is larger than a predetermined threshold, the bias operation unit 240 outputs ultra-wideband signals, which have been received by an antenna, to the SOA 220. In this regard, when current within the optical absorption area is applied to the bias operation unit 240, the SOA 220 performs the optical detection function. When current within the linear area is applied to the bias operation unit 240, the SOA 220 performs the optical modulation function.

The bias control unit 260 selectively applies bias current for controlling bias operation of the bias operation unit 240 to the bias operation unit 240 according to the presence of an input signal, on the basis of a predetermined threshold current.

On the basis of the predetermined threshold current, the bias control unit 260 selectively applies bias current for controlling bias operation of the bias operation unit 240 to the bias operation unit 240 according to whether an input signal exists or not. When a signal for controlling an bias operation is not input from outside, the bias control unit 260 transmits current, which is smaller than a predetermined threshold current, to the bias operation unit 240. When a signal for controlling an bias operation is inputted from outside, the bias control unit 260 transmits current which is larger than a predetermined threshold current, to the bias operation unit 240.

The switch 280 selectively outputs a signal for controlling bias operation of the bias operation unit 240 according to communication requirement signals of outside devices received by an antenna. The communication requirement signals of outside devices received by the antenna may be divided into reception requirement signals for receiving corresponding data from the AP 200 and transmission requirement signals for transmitting corresponding data to the AP 200. Accordingly, when the reception requirement signals are received by the antenna, the switch 280 does not output a signal so that the bias control unit 260 can transmit the current, which is smaller than a predetermined threshold current, to the bias operation unit 240. Further, when the transmission requirement signals are received by the antenna, the switch 280 outputs a signal so that the bias control unit 260 can transmit the current, which is larger than a predetermined threshold current, to the bias operation unit 240.

Preferably, while signals for transmission are not received, the switch 280 does not output a signal so that the bias control unit 260 can transmit the current which is smaller than a predetermined threshold current, to the bias operation unit 240.

The following is a detailed description of various signals flows in accordance with aspects of the present invention.

When it is determined that a downstream communication, in which the AP 200 sends ultra-wideband signals through an antenna, is performed, the switch 280, which selectively outputs a signal for controlling bias operation according to communication requirement signals received by an antenna, does not output a signal to the bias control unit 260. While a signal is not received from the switch 280, the bias control unit 260 outputs the current, which is smaller than a predetermined threshold current, to the bias operation unit 240. The bias operation unit 240 outputs electrical signals transmitted from the SOA 220 to an antenna. As described above, the SOA 220 performs the optical detection function.

Also, when it is determined that an upstream communication, in which the AP 200 receives signals transmitted from outside devices after the transmission requirement signals are received by an antenna, is performed, the switch 280 output a signal to the bias control unit 260. While a signal is received from the switch 280, the bias control unit 260 outputs the current, which is larger than a predetermined threshold current, to the bias operation unit 240. The bias operation unit 240 biases the current transmitted from the bias control unit 260 to the SOA 220. As described above, the SOA 220 performs the optical modulation function.

For an optical detection function, a reverse bias may be applied to the SOA 220 to improve the response characteristic.

Accordingly, when an AP is constructed using the SOA 220, which is a single device with the optical detection function and the optical modulation function, the size and constructing cost for a network is reduced.

Figure 4:
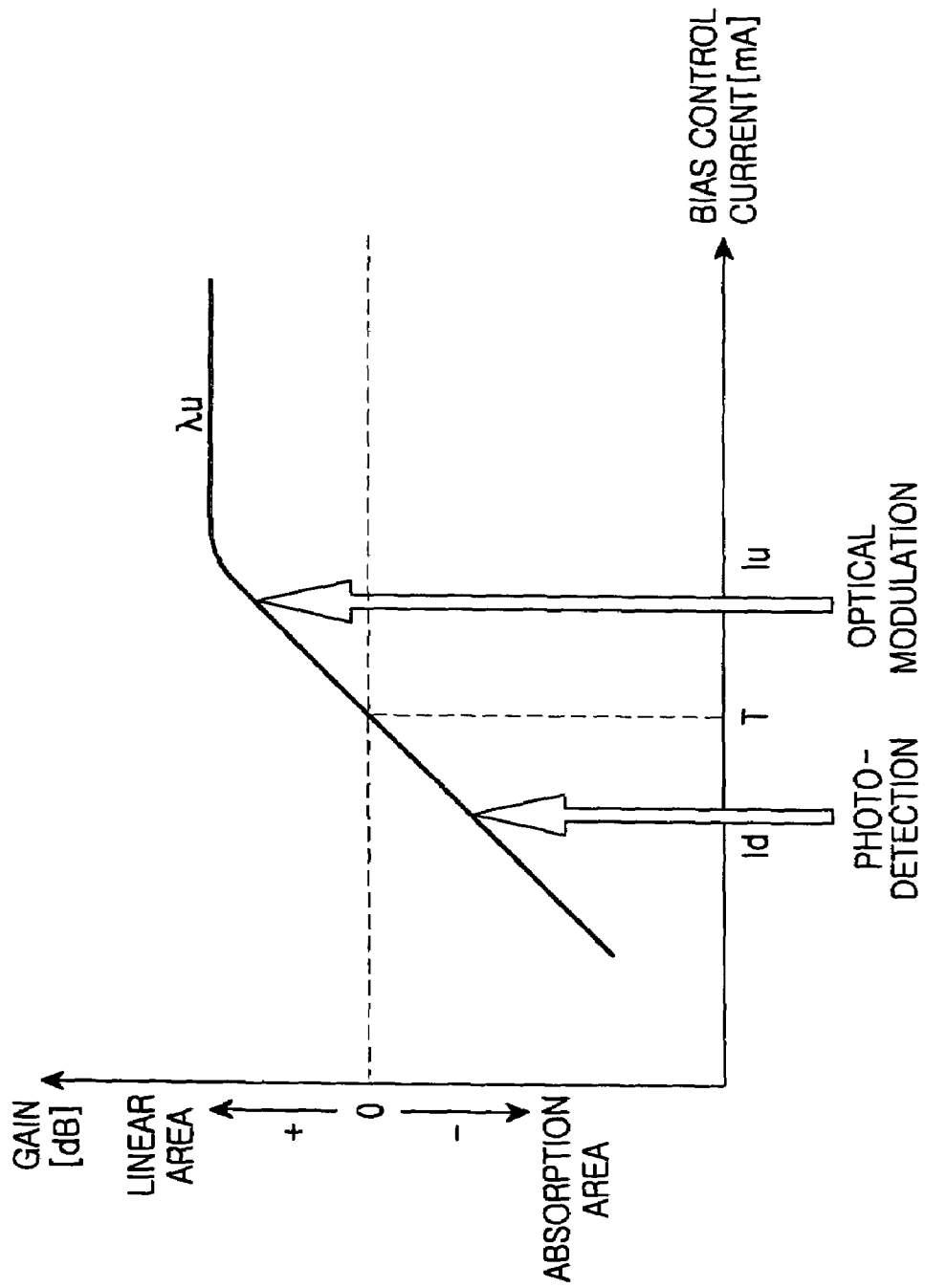
FIG. 4 is a graph illustrating a gain characteristic of a semiconductor optical amplifier employed in realizing an access point according to aspects of the present invention.

FIG. 4 is a graph illustrating a gain characteristic of a semiconductor optical amplifier employed in realizing an access point according to aspects of the present invention.

As shown in FIG. 4, it can be understood that a gain characteristic of the SOA 220 is in an optical absorption area or a linear area according to bias current intensity input to the bias operation unit 240. Accordingly, when the gain characteristic is in the optical absorption area, the SOA 220 performs the optical detection function in order to perform the downstream communication of sending ultra-wideband signals transmitted from the CS 100 through an antenna. When the gain characteristic is in to the linear area, the SOA 220 performs the optical modulation function in order to perform the upstream communication of transmitting ultra-wideband signals received by an antenna to the CS 100.

When a current within the optical absorption area, (i.e., a current Id smaller than a predetermined threshold current T) is input to the bias operation unit 240, the SOA 220 performs the optical detection function for the downstream communication. In this situation, the SOA 220 has a negative gain.

When a current within the linear area, (i.e., a current Iu larger than the predetermined threshold current T) is input the to bias operation unit 240, the SOA 220 performs the optical modulation function for the upstream communication. In this situation, the SOA 220 has a positive gain.

According to the embodiments of the present invention, an AP can be constructed by using a SOA, which is a single optical device with the optical detection function for a downstream communication and the optical modulation function for an upstream communication, thereby reducing the size of products as well as reducing the construction costs of such networks.

In addition, such a reduced-cost AP may be constructed to facilitate communication activity of not only fiber to the home (FTTH) but also fiber in the home (FITH).

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An access point in an optical fiber-based wireless network, the access point comprising:
    an antenna for transceiving signals and receiving a communication requirement signal transmitted from an external device;
    a semiconductor optical amplifier for selectively performing an optical detection function of converting optical signals, which have been received through a first optical fiber, into electrical signals and sending the converted electrical signals through the antenna, and an optical modulation function of converting signals, which have been received by the antenna, into optical signals and transmitting the converted optical signals through second optical fiber, according to the communication requirement signals, and the communication requirement signal includes at least one of reception requirement signal in order to receive corresponding data and transmission requirement signals transmitted by the external device in order to transmit corresponding data;
    a switch for selectively outputting a signal for providing corresponding command according to the communication requirement signal received by the antenna;
    a bias control unit for selectively outputting bias current with variable intensity according to whether an output of the signal from the switch exists or not, on the basis of a predetermined threshold current; and
    a bias operation unit for outputting signals transmitted from the semiconductor optical amplifier to the antenna when a bias current, which is smaller than the predetermined threshold current, is output from the bias control unit, and for outputting signals received by the antenna to the semiconductor optical amplifier when a bias current, which is larger than the predetermined threshold current, is outputted from the bias control unit.

2. The access point as claimed in claim 1, wherein the switch does not output the signal when the communication requirement signal is the reception requirement signal, and the switch outputs the signal when the communication requirement signal is the transmission requirement signal, and
    wherein the bias control unit outputs the bias current, which is smaller than the predetermined threshold current, when the signal is not output from the switch, and the bias control unit outputs the bias current, which is larger than the predetermined threshold current, when the signal is output from the switch.

3. The access point as claimed in claim 1, wherein a reverse bias is applied to the semiconductor optical amplifier in order to enable an optical detection function to be performed.

4. An optical fiber-based wireless network system, the system comprising:

a central station including an optical modulation unit for converting ultra-wideband signals to be transmitted into optical signals and an optical demodulation unit for converting received optical signals received into electrical signals;

a first optical fiber for transmitting optical signals modulated by the optical modulation unit to an outside, wherein the first optical fiber is connected to the optical modulation unit;

a second optical fiber for transmitting optical signals to the optical demodulation unit, wherein the second optical fiber is connected to the optical demodulation unit;

an access point including a switch for receiving communication requirement signals transmitted from an external device and a semiconductor optical amplifier for selectively performing an optical detection function of converting optical signals, which have been transmitted through the first optical fiber, into electrical signals and sending the converted electrical signals through an antenna, and an optical modulation function of converting signals, which have been received by the antenna, into optical signals and transmitting the converted optical signals to the central station through the second optical fiber, according to the communication requirement signals, and the communication requirement signals include at least one of a reception requirement signal transmitted by the external device in order to receive corresponding data and a transmission requirement signal transmitted by the external device in order to transmit corresponding data;

a switch for selectively outputting a signal for providing corresponding command according to communication requirement signals received by the antenna;

a bias control unit for selectively outputting bias current with variable intensity according to whether an output of the signal from the switch exists or not, on the basis of a predetermined threshold current; and a bias operation unit for outputting signals transmitted from the semiconductor optical amplifier to the antenna when a bias current, which is smaller than the predetermined threshold current, is output from the bias control unit, and for outputting signals received by the antenna to the semiconductor optical amplifier when a bias current, which is larger than the predetermined threshold current, is output from the bias control unit.

5. The system as claimed in claim 4, wherein the switch does not output the signal when the communication requirement signal is the reception requirement signal, and the switch outputs the signal when the communication requirement signal is the transmission requirement signal, and wherein the bias control unit outputs the bias current, which is smaller than the predetermined threshold current, when the signal is not output from the switch, and the bias control unit outputs the bias current, which is larger than the predetermined threshold current, when the signal is outputted from the switch.

6. The optical fiber-based wireless network system as claimed in claim 4, wherein a reverse bias is applied to the semiconductor optical amplifier in order to enable an optical detection function to be performed.

\* \* \* \* \*